Patented Dec. 3, 1940

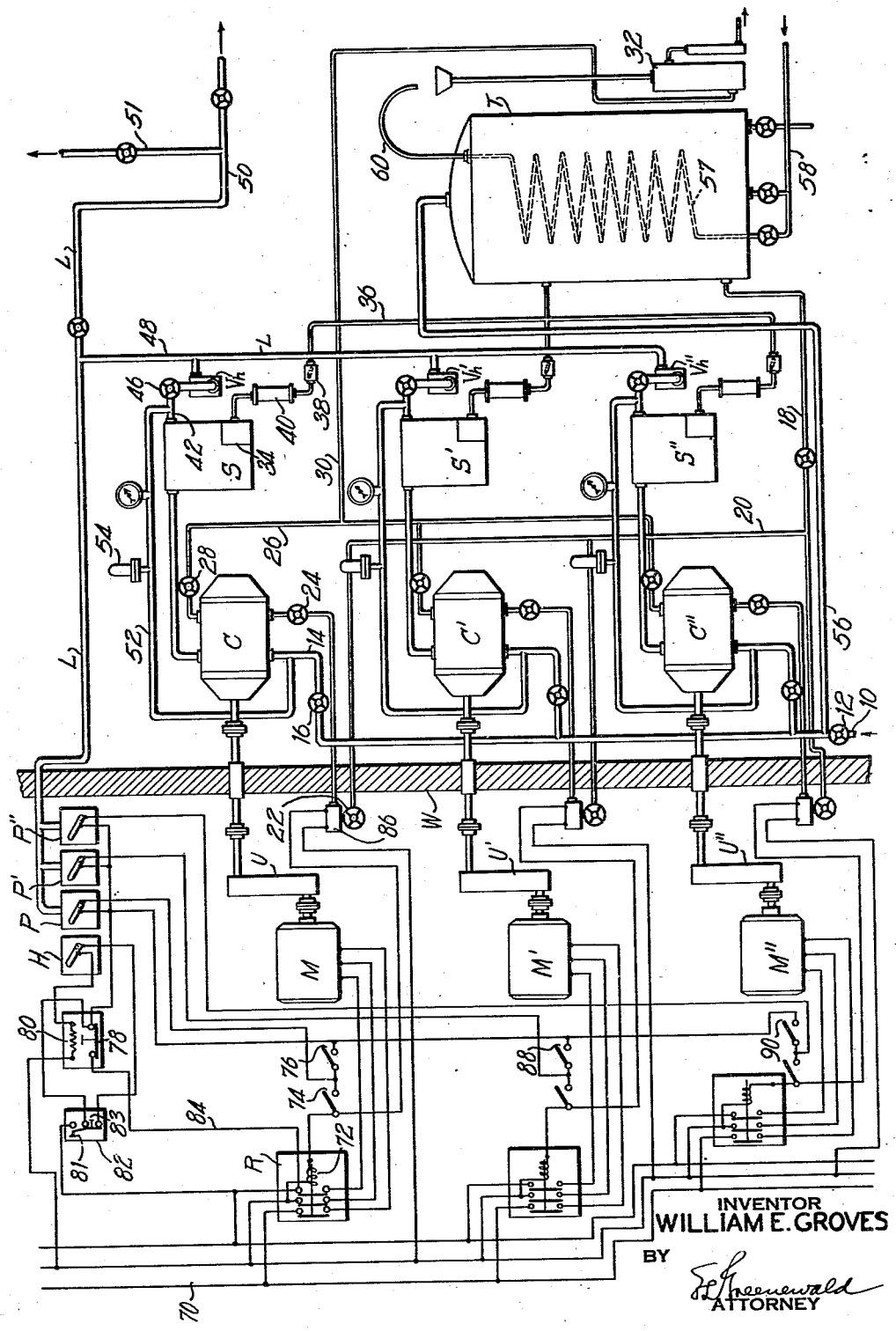

2,223,415

UNITED STATES PATENT OFFICE 2,223,415

GAS PRESSURE BOOSTER SYSTEM

William E. Groves, Indianapolis, Ind., assignor to Oxweld Acetylene Company, a corporation of West Virginia Application February 9, 1939, Serial No. 255,402

14 Claims. (Cl. 230—18)

This invention relates to improvements in gas generating systems and particularly to pressure boosters, and to a flexible system including electrical, pressure, and capacity controls for raising the pressure of, and for continuously delivering a generated gas to a point of consumption.

In the generation and utilization of gases of various types, and particularly of acetylene, where pressure limitations are important, and where any considerable volume of gase may be required to accommodate a given program, it is necessary to maintain an even flow of gas under determined conditions of pressure.

An object of this invention is to provide a gas pressure booster system including multiple booster units and an electrical intercontrol therefor which control may be operated by any predetermined pressure desired to be maintained at the point of consumption.

Other objects of the invention include the provision of one or more pressure booster units including a motor-driven gas compressor for each unit, the operation of which may be controlled by pressure of the gas in the main line into which the compressed gas is delivered, and/or by the volume of the gas in the gas holder from which the unit is supplied; the provision of a system including more than one of such pressure boster units in which the units are connected in parallel for handling extremely large quantities of generated gas; and the provision of such a system in which an electrical intercontrol is provided for selectively operating the compressor units.

The above and other objects and novel features of the present invention will become apparent upon consideration of the following description and the accompanying drawing. The drawing discloses one example of a system to which the principles of this invention may be applied and is a schematic representation of a gas-pressure booster system, including actuating motors for driving the booster units as well as an electrical intercontrol for the pressure and capacity control devices.

The desired flexibility of control in a gas booster system, particularly in an acetylene gas booster system, where gas pressures are required to be raised from atmospheric pressure to a maximum of about fifteen pounds per square inch, may be attained by compressing the generated gas in one or more compressor units. These units may be arranged in parallel in order to increase the volume capacity of the equipment, and they may be severally and simultaneously controlled in response to variations in pressure in the system or by other factors which may be set up or found to be determinants of the operating conditions of said unit.

The principles of the invention are shown as applied to a booster system for an acetylene generating plant. Only the units of the booster system and their electrical intercontrol circuits are shown since the principles of the invention may be applied with equal facility to other gas generating plants. The system is shown as comprising a plurality of compressors C, C' and C" fed with acetylene from a gas holder (not shown), and with water from a cooling tank T. The compressors are connected in a manner to deliver gas under pressure into a common delivery line L after the gas has passed through separators S, S' and S" in which the gas is separated from the water. The gas under pressure is delivered through hydraulic back-pressure valves $V_h$, $V_h'$ and $V_h''$ from which it is fed through the line L to the point of consumption. Each of the compressors C, C' and C" is provided with a motor M, M' and M" respectively, the operation of the latter being controlled by an electrical intercontrol circuit. This electrical circuit may be influenced separately by the position of the gas holder or by the pressure of the discharged gas in line L, or it may be influenced solely by the former. Additionally, the means for controlling the motors M, M' and M" in accordance with the gas delivery pressure in line L may include pressure operated switches P, P' and P" respectively, which may be individually set to cut in and cut out the corresponding motors in accordance with any predetermined pressure within line L.

Referring to the drawing, an acetylene conduit 10 provided with a manually operable valve 12 conducts acetylene from the gas holder of the generating plant (not shown) to the suction side of the compressor C through a branch line 14 including a manually operable valve 16. Water from the cooling tank T is delivered to the suction side of the compressor C through the conduit 18, branch 20, a manually operable valve 22, a solenoid operated valve 86, and a temperature control valve 24, which latter may be manually operated. Each of the booster units is similar to that disclosed in U. S. patent to De Motte 1,991,548. Accordingly, a continuous supply of water is adapted to be fed to the compressor C in accordance with the temperature of the discharged compressed gas, or in accordance with the manual setting of valve 24. During the normal operation of the compressor C, the water is discharged with gas under pressure into the separator S. The separator S includes a float-operated valve 34 adapted to discharge the water from the separator S without permitting the escape of the compressed gas therefrom. The water from the separator S flows to the cooling tank T through conduit 36 including check valve 38. A sight glass 40 is provided in the conduit 36 and during normal operation of the apparatus this glass reveals running water. A relief line 26 including a manually operable, normally closed valve 28 is employed to discharge the water from the system when the compressor C is shut down. The line 26 connects to pipe 30 which leads to a trap 32, thence to a sewer.

The compressed gas is withdrawn from the separator S through the conduit 42 including a manually operable valve 46. The compressed gas is then discharged into the hydraulic back-presure valve $V_h$ and thence into the main line L comprising conduit 48 which delivers the compressed gas to the point of consumption through the conduit 50, the latter having a valved atmospheric vent 51.

In the event that the rate of consumption of the compressed gas is less than the rate of pumping of the compressor C, means is provided for preventing an excess of pressure within the main delivery line 48. This means comprises a by-pass 52 leading from the discharge side of the separator S to the suction side of the compressor C. The conduit 52 includes a spring-loaded diaphragm type of regulator 54. The regulator 54 is set to open at a pressure not greatly in excess of that desired for consumption. In order to equalize the pressure of the gas on the water within tank T and at the suction side of the compressor C, a by-pass 56 is provided in the main acetylene line 10 which extends to the top of the cooling tank T. Water within the tank T is maintained in a cool condition by providing a cooling coil 57 within the tank T which is fed with water from a conduit 58 leading from a main supply of water. The water from coil 57 discharges into a pipe 60 from which it empties into the trap 32. The tank T is further provided with suitable connections with the main water supply line 58 to replenish the supply of water in the tank, as well as a suitable drain valve.

The booster units including the compressors C' and C'' are likewise adapted to receive acetylene from the gas holder (not shown) through branch conduits leading from the main acetylene conduit 10 as well as a continuous supply of water from the cooling tank T. These units including the compressor C' and C'' are similar to that including compressor C, and for this reason they will not be specifically described. However, it is pointed out that these units are arranged in parallel with respect to the booster unit comprising the compressor C and that they respectively discharge compressed gas into the main discharge conduit 48. When more than two booster units are employed in parallel, separate hydraulic back-pressure valves $V_h'$ and $V_h''$ may be connected into the system in parallel relation with valve $V_h$ and between the respective separators S', S'' and the main discharge conduit 48.

The primary purpose of employing a plurality of booster units in parallel relation is to provide a system wherein maximum flexibility may be produced. For example, a booster unit including the compressor C may be arranged to deliver a compressed gas from a gas holder to a point of consumption, and it will do so within its individual range of operation. However, when the demand of compressed gas exceeds the capacity of the single booster unit including the compressor C, the units including the compressors C' and C'' may be set to augment the delivery of gas obtainable with the first unit.

The motors M, M' and M'' are adapted to drive the compressors C, C' and C'' through manually adjustable variable speed transmission units U, U' and U''. Accordingly, the pumping rate of the compressors C, C' and C'' may be varied at will. The shafts connecting the units U, U' and U'' to the compressors pass through a wall W which separates the motors and their electrical controls from the booster units, thus eliminating explosion hazards.

The motor M is connected across the lines of a three-phase power supply 70. A magnetically-operated starting relay R is interposed between motor M and the main lines 70. The holding coil 72 of the magnetic starting relay R is connected in series with two manually operable switches 74 and 76, for a purpose to be described later, and in series with a relay 78. The holding coil 80 of the relay 78 is in series with a mercury switch H, which latter is connected to, and is operable in accordance with the movement of the gas holder (not shown). This holding coil 80 is also in series with a push-button switch 82, including a normally open portion 81 and a normally closed portion 83. Thus, if switch H is in closed position, closing of switch portion 81 causes energization of holding coil 80, thereby effecting the closing of switch 78. Closing of switch 78 completes the circuit through holding coil 72 of relay R provided manually operable switches 74 and 76 are closed. Switch 74 is intended as a safety precaution to insure against accidental operation by inadvertently closing switch 81. Energization of holding coil 72 effects closing of relay R, which connects the motor M to the three-phase power supply lines 70 thus starting motor M and consequently compressor C. Upon completing the circuit through holding coil 72, subsequent opening of push-button switch 81 will not interrupt the circuit through coil 72 because of the holding circuit including holding coil 80, automatic switch H, the normally closed portion 83 of push-button switch 82, switch 78, and conductor 84.

In order to insure a constant supply of water to the compressor C simultaneously with the starting, and continuously during the operation of compressor C, the water line 20 leading to compressor C is provided with the solenoid actuated valve 86, the solenoid of which is connected in parallel with the holding coil 72 of relay R and in series with switches 74, 76 and 78. From the foregoing it is apparent that, so long as the gas holder contains an adequate supply of gas, the booster unit including the motor M and compressor C is in condition to elevate the pressure of the generated gas and deliver it to the point of consumption. Upon starting the unit, it will continue to automatically function until the position of the gas holder trips the mercury switch H, thereby automatically stopping the apparatus. Of course, the apparatus may be stopped at will by simply manually opening switches 83 or 74. While the previously described control is dependent upon the position of the gas holder, it may be desirable to control the operation of the booster unit in accordance with the pressure of the compressed gas. The importance of such a means will become apparent when more than one booster unit is to be employed. Accordingly, an additional mercury switch P is shunted across the manually operable switch 76. The switch P is connected to, and adapted to be operated by the pressure in the main gas discharge line 48. An increase in pressure in line 48 beyond a predetermined value opens switch P and a decrease in said pressure below a predetermined value closes switch P. Thus, when switch 76 is closed, the control of the apparatus is solely dependent upon the position of the gas holder switch H; and when switch 76 is open the control of the apparatus is dependent upon both the discharge pressure and the position of the gas holder.

The circuits for motors M' and M'' which drive compressors C' and C'' are similar to that of motor M. Each of the circuits for motors M' and M'' includes the switch H, thereby insuring a control of all of the motors in accordance with the quantity of gas in the gas holder. Additionally, the circuits for motors M' and M'' include separate mercury switches P' and P'', respectively, shunted across switches 88 and 90 in the same manner that switch P is shunted across switch 76. Likewise, mercury switches P' and P'' are connected to, and adapted to be operated by the pressure of the generated compressed gas in the discharge conduit 48. The last two switches may be, however, adjusted to operate at successively lower pressures from that which will operate switch P. Thus, the switches P, P' and P'' may be set so that they are all open when a pressure in excess of 15 pounds per square inch exists in the line 48, and so that they close successively when the pressure falls below, say, 15, 13, and 11 pounds per square inch respectively. Thus, a flexible system is provided including an electrical intercontrol operated in accordance with the volume of gas in the holder as well as a stepped control to successively cut in additional booster units as the demand on the main line causes the discharge pressure to fall to predetermined values below that which is desired.

While the principles of the invention have been shown and described in connection with a particular embodiment, it is apparent that certain details may be employed without others and that one or more units may be employed without departing from the principles of the invention.

What is claimed is:

1. A booster system for increasing the pressure of a gas comprising, in combination, a booster unit including a compressor; a gas supply for feeding gas to said compressor; a water supply for feeding water to said compressor; a motor for driving said compressor; manually operable means for starting said motor; and automatic means for stopping said motor and said water supply when the supply of gas falls below a predetermined value.

2. A booster system for increasing the pressure of a gas as claimed in claim 1, in which said automatic means and said water supply for feeding water to said compressor includes valve means, and means controlled by the electrical circuit of said motor for opening said valve to start the feed of water to said compressor when said compressor motor is started, and for closing said valve to discontinue the feed of water thereto when said compressor motor is stopped.

3. A booster system for increasing the pressure of a gas comprising, in combination, a booster unit including a compressor; a gas supply for feeding gas to said compressor; a motor for driving said compressor; means for controlling the operation of said motor in accordance with the quantity of gas in said gas supply; and separate means for controlling the operation of said motor in accordance with the delivery pressure of said compressor.

4. A booster system for increasing the pressure of a gas as claimed in claim 3, in which such quantitative control means may be employed separately or in combination with said separate means.

5. An electrical control circuit for a motor adapted to drive the compressor of a gas booster system comprising a magnetically operated starting relay for said motor; a manually operable switch and a magnetically operated switch in series with the holding coil of said starting relay; and a push-button switch and an automatically operated switch in series with the holding coil of said magnetically operated switch, said automatic switch being influenced by the quantity of gas being supplied to said compressor.

6. An electrical circuit for a motor adapted to drive the compressor of a gas booster system comprising a magnetically operated starting relay for said motor, said relay having a holding coil to maintain said relay in operating position; means for energizing said holding coil; a solenoid operated valve adapted when energized to deliver water to said compressor for admixture with said gas, the solenoid of said valve being in circuit with the holding coil of said starting relay, thereby being adapted to open said valve when said holding coil is energized to start said motor.

7. An electrical circuit for a motor adapted to drive the compressor of a gas booster system comprising a magnetically operated starting relay for said motor; a manually operable switch and a magnetically operated switch in series with the holding coil of said starting relay; a pressure operated switch in parallel with said manually operable switch; and a push-button switch and an automatically operated switch in series with the holding coil of said magnetically operated switch, said pressure operated switch being controlled in response to the compressor delivery pressure, and said automatic switch being operated in response to the quantity of gas being supplied to said compressor.

8. An electrical circuit as claimed in claim 7, in which a pair of manually operable switches are in series with the holding coil of said starting relay and said pressure operated switch is adapted to shunt only one of said manually operable switches.

9. A booster system for increasing the pressure of a gas comprising, in combination, a plurality of booster units each including a compressor; a common gas supply for all of said compressors; a separate motor for each of said compressors; means for controlling the operation of all of said motors in accordance with the quantity of said gas supply; and separate means for each of said motors for individually controlling its operation in accordance with the combined delivery pressure of said compressors.

10. A booster system for increasing the pressure of a gas as claimed in claim 9, in which the quantitative control means for all of said motors may be employed separately or in combination with the individual pressure operated control means.

11. A booster system for increasing the pressure of a gas as claimed in claim 9, in which said separate means may be set to start the motors successively in accordance with a decrease of the combined delivery pressure to successively lower predetermined values.

12. An electrical intercontrol circuit for a plurality of motors each of which is adapted to drive a compressor of a system including a plurality of booster units comprising, in combination, a magnetically operated relay for each of said motors; a manually operable switch in series with the holding coil of the relay for each of said motors and a common magnetic switch for all of said motors in series with the holding coils of each of said motor relays; separate pressure controlled switches in parallel with each of said manually operable switches; and a push-button switch and an automatically operated switch in series with the holding coil of the common magnetic switch, said automatic switch being controlled by the quantity of gas supplied to the booster system.

13. An electrical intercontrol circuit as claimed in claim 12, in which a pair of manually operable switches are provided for each of said motors and a common magnetic switch for all of said motors, and in which each pair of manually operable switches and said magnetic switch are in series with the holding coil of one of said motor relays, and said separate pressure controlled switches are adapted to shunt only one of said manually operable switches in each pair.

14. An electrical intercontrol circuit as claimed in claim 12, in which separate solenoid operated water valves are provided for each booster unit the solenoids of which are in parallel with the holding coils of the corresponding motor relay and in series with the corresponding manually operable and magnetically operated switches.

WILLIAM E. GROVES.